United States Patent
Ryu et al.

(10) Patent No.: US 7,391,629 B2
(45) Date of Patent: Jun. 24, 2008

(54) SWITCHING MODE POWER SUPPLY WITH CONTROLLER FOR HANDLING OVERCURRENTS

(75) Inventors: Young-Chul Ryu, Gyeonggi-do (KR); Jin-Ho Choi, Seoul (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 0 days.

(21) Appl. No.: 11/197,801

(22) Filed: Aug. 5, 2005

(65) Prior Publication Data

US 2006/0028847 A1 Feb. 9, 2006

(30) Foreign Application Priority Data

Aug. 5, 2004 (KR) .................... 10-2004-0061689

(51) Int. Cl.
- *H02H 7/122* (2006.01)
- *H02H 9/02* (2006.01)
- *H02M 3/335* (2006.01)

(52) U.S. Cl. .................... 363/56.1; 363/49; 363/21.18; 361/93.1

(58) Field of Classification Search ............... 363/21.1, 363/21.12, 21.15, 21.18, 56.1, 49, 56.03, 363/56.07; 323/901; 361/18, 93.1, 93.2

See application file for complete search history.

(56) References Cited

U.S. PATENT DOCUMENTS

| | | | | |
|---|---|---|---|---|
| 4,272,805 A | * | 6/1981 | Iguchi et al. | 363/19 |
| 4,692,853 A | * | 9/1987 | de Sartre et al. | 363/49 |
| 6,359,795 B1 | * | 3/2002 | Amantea et al. | 363/21.01 |
| 6,381,151 B1 | * | 4/2002 | Jang | 363/21.01 |
| 6,445,598 B1 | * | 9/2002 | Yamada | 363/21.12 |
| 6,469,915 B2 | * | 10/2002 | Huang et al. | 363/25 |
| 6,643,153 B2 | * | 11/2003 | Balakrishnan et al. | 363/95 |
| 6,646,847 B2 | * | 11/2003 | Poe et al. | 361/93.1 |
| 6,665,197 B2 | * | 12/2003 | Gong et al. | 363/21.01 |
| 6,667,605 B2 | * | 12/2003 | Balakrishnan et al. | 323/277 |
| 6,768,655 B1 | * | 7/2004 | Yang et al. | 363/21.01 |
| 6,809,678 B2 | * | 10/2004 | Vera et al. | 341/166 |
| 7,035,119 B2 | * | 4/2006 | Koike | 363/19 |
| 7,099,164 B2 | * | 8/2006 | Zhu et al. | 363/21.12 |
| 2003/0002233 A1 | * | 1/2003 | Usui | 361/18 |

\* cited by examiner

*Primary Examiner*—Jeffrey L. Sterrett
*Assistant Examiner*—Harry Behm
(74) *Attorney, Agent, or Firm*—Sidley Austin LLP

(57) ABSTRACT

Disclosed is an SMPS for preventing abnormal overcurrents. A circuit having a short circuit delay is used to generate a control signal for turning off a main switch (i.e., a switching MOS transistor) when the overcurrent occurs, that is, in an initial startup or when a protection circuit is operated. Accordingly, a drain-source voltage of the main switch is reduced when the main switch is turned off, and a switching MOS transistor with a low withstanding voltage can be used.

12 Claims, 5 Drawing Sheets

SWITCHING MODE POWER SUPPLY WITH CONTROLLER FOR HANDLING OVERCURRENTS

CROSS REFERENCE TO RELATED APPLICATION

This application claims priority to and the benefit of Korea Patent Application No. 10-2004-0061689 filed on Aug. 5, 2004 in the Korean Intellectual Property Office, the entire content of which is incorporated herein by reference.

BACKGROUND OF THE INVENTION (a) Field of the Invention

The present invention relates generally to switching mode power supplies (SMPSs). More particularly, the present invention relates to an SMPS for preventing overcurrents.

(b) Description of the Related Art

In general, an SMPS is a device for converting a DC supply voltage into at least one DC output voltage which may be greater or less than the DC supply voltage. The SMPS may be used as a power supply for batteries installed in mobile telephones and laptop computers.

SUMMARY OF THE INVENTION

In one embodiment of the present invention, a switching mode power supply (SMPS) is provided, which may comprise a power supply having a main switch coupled to a primary coil of a transformer, and supplying power to a secondary coil of the transformer according to an operation of the main switch. A feedback circuit generates a feedback voltage corresponding to an output voltage at the secondary coil. A switching controller includes a normal operation circuit for comparing the feedback voltage to a first voltage corresponding to a current flowing through the main switch. The normal operation circuit generates a first control signal for controlling the duty of the main switch. An overcurrent operation circuit compares a predetermined voltage with the first voltage and generates a second control signal for controlling the duty of the main switch. The overcurrent operation circuit has a circuit delay which is shorter than that of the normal operation circuit.

In another embodiment of the present invention, a switching controller is provided for controlling a duty of a main switch of a switching mode power supply (SMPS). The SMPS includes a main switch coupled to a primary coil of a transformer and a feedback circuit for generating a feedback voltage corresponding to an output voltage provided to a secondary coil of the transformer. The switching controller may comprise a first comparator for comparing the feedback voltage to a first voltage corresponding to a current flowing through the main switch. A leading edge blanking circuit is coupled to an output terminal of the first comparator. A second comparator compares a predetermined voltage to the first voltage. An inverter inverts an output of the second comparator. A NOR gate has a first input terminal for receiving an output from the inverter, and a second input terminal for receiving a low signal in an initial startup of the SMPS or when a protection circuit of the SMPS is operated. An OR gate has a first input terminal for receiving an output from the leading edge blanking circuit, and a second input terminal for receiving an output from the NOR gate. A duty of the main switch is controlled by a signal applied in advance from among the signals applied to the first and second input terminals of the OR gate.

Important technical advantages of the present invention are readily apparent to one skilled in the art from the following figures, descriptions, and claims.

BRIEF DESCRIPTION OF THE DRAWINGS

The accompanying drawings, which are incorporated in and constitute a part of the specification, illustrate embodiments of the invention, wherein.

DETAILED DESCRIPTION OF THE PREFERRED EMBODIMENTS

Embodiments and advantages of the present inventions are best understood by referring to FIGS. 1 through 5 of the drawings. Like numerals are used for like and corresponding parts of the various drawings.

An SMPS may be incorporated into and used for supplying power to an electronic device. In an SMPS, an overcurrent can flow to a main switch when the SMPS supplies an initial input voltage, such as during startup. That is, when the electronic device is turned on, the SMPS may be required to supply a relatively large amount of power to the primary coil of the SMPS while little or no power is supplied to the secondary coil. Thus, a turn-on time of the main switch is increased and an overcurrent can flow to the main switch. This overcurrent may cause substantial stress to various elements, including the main switch itself. A soft start method can be used to solve such a problem.

One soft start method is to gradually increase the turn-on time of the main switch by forcibly and sequentially increasing the level of a feedback voltage Vfb during an initial startup. That is, power supplied to the secondary coil is gradually increased by forcibly setting the turn-on time of the main switch and setting the current flowing through the main switch to be less than a predetermined level irrespective of the power requirement of the secondary coil.

Figure 1:
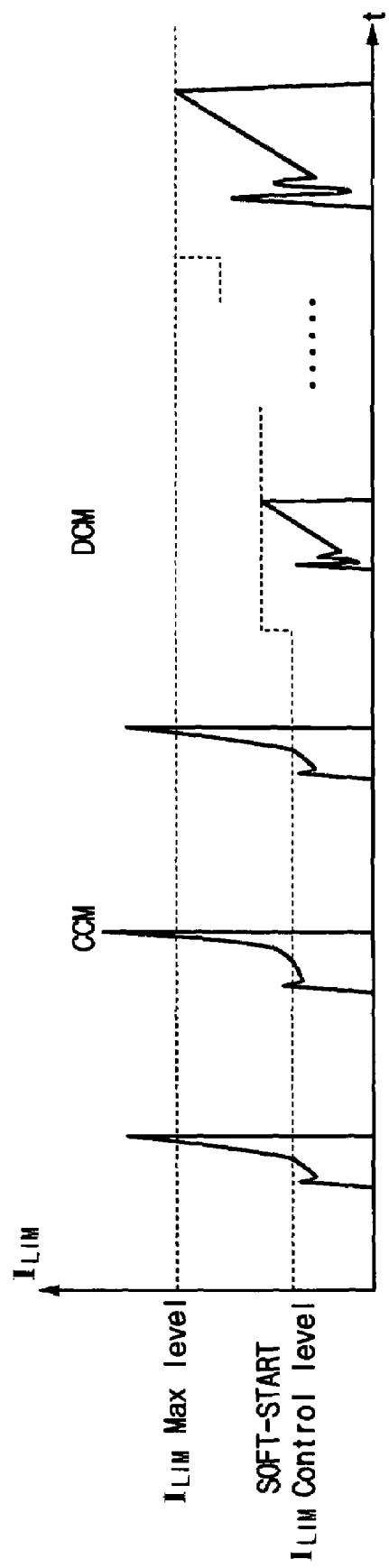
FIG. 1 is a diagram representing current flowing through a main switch according to a typical soft start method.

FIG. 1 is a diagram representing the current flowing through a main switch according to a typical soft start method. The current $I_{LIM}$ rises with a gradient from an initial current which is not zero since the main switch is operated in a continuous current mode (CCM) during the initial soft start. The main switch is operated in a discontinuous current mode (DCM) after a predetermined time has elapsed. The current denoted by "SOFT-START $I_{LIM}$ control level" represents the reference current $I_{LIM}$ flowing through the main switch and turning off the main switch during an initial startup.

The current $I_{LIM}$ may exceed the maximum level (denoted as $I_{LIM}$ Max level) since the secondary coil of the SMPS requires a lot of power and a time delay may be provided by the SMPS. Even though the feedback voltage Vfb may be set low by the soft start method, because the secondary coil requires so much power and a time delay may be necessary to turn off the main switch from the forced feedback voltage Vfb, the main switch may be turned on for the duration of the delay time such that the current $I_{LIM}$ of the main switch may exceed the maximum level. In this instance, the current is abruptly increased when the transformer in the SMPS is saturated.

The time delay may include a circuit time delay for setting the main switch on/off in a control module and a turn-on/off time for the main switch. An important component of the circuit time delay is an internal time delay in a leading edge blanking (LEB) circuit for eliminating or neglecting a parasitic current caused by an inverse recovery current of a diode on the secondary coil. Referring to FIG. 1, the inverse recovery current or surge current may be generated when the main switch is turned on from the turned-off state.

When the current $I_{LIM}$ is abruptly increased to a level greater than the maximum level ($I_{LIM}$ Max Level) as shown in FIG. 1, the voltage at the main switch may be further increased because of the parasitic component of the transformer in the SMPS. That is, energy stored in the parasitic component of the transformer by an overcurrent of the current $I_{LIM}$ when the main switch is turned on may cause a voltage when the main switch is turned off. This additional voltage increases the voltage at the main switch, which may then exceed the maximum allowable voltage of the main switch.

In addition to the above-noted initial startup process, another case in which the current $I_{LIM}$ can become an overcurrent occurs when the output load is shorted to operate a protection circuit since the secondary coil continuously requires power and has a time delay.

Figure 2:
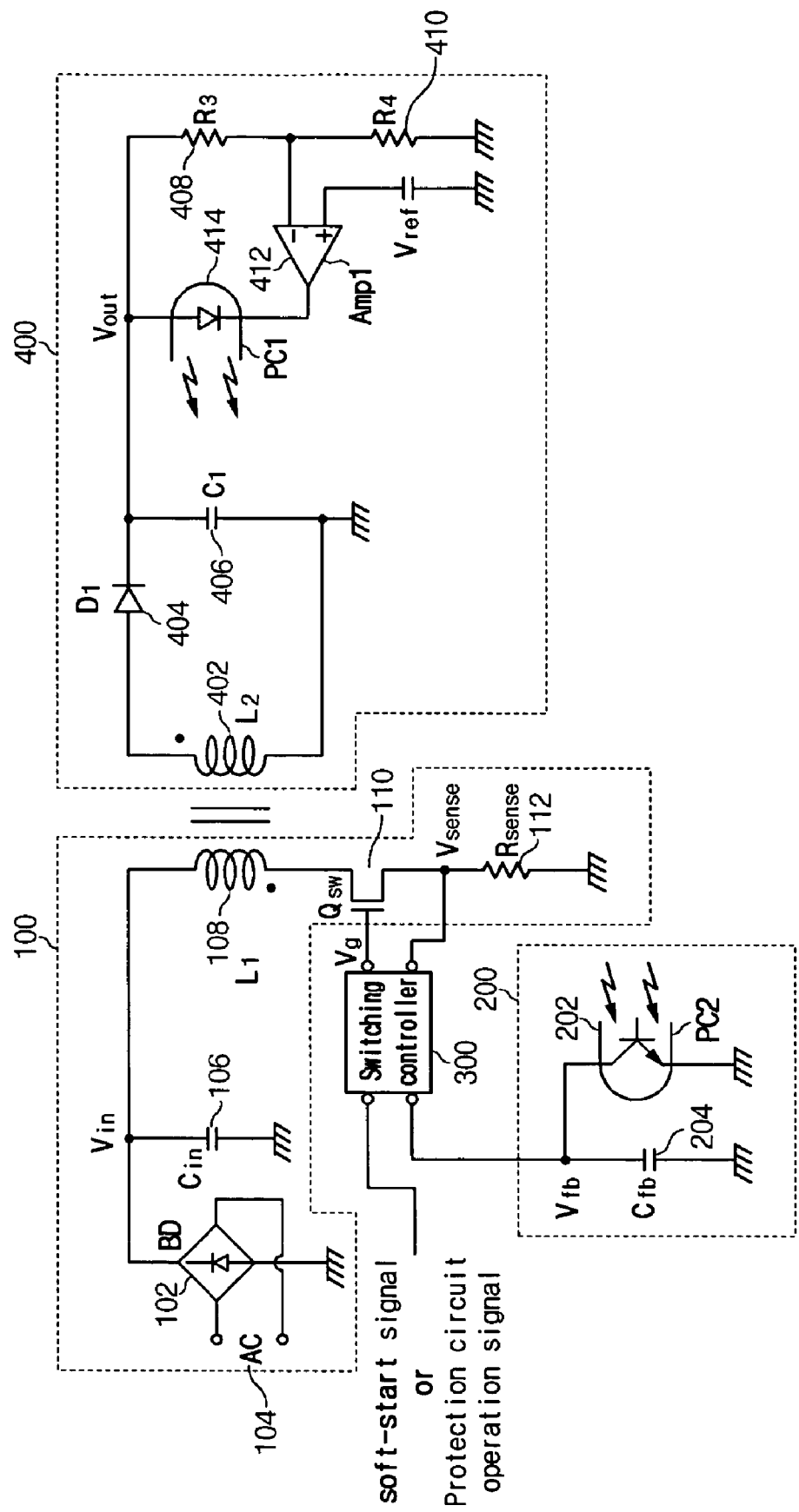
FIG. 2 is a schematic diagram of an exemplary implementation of an SMPS, according to an embodiment of the present invention.

FIG. 2 is a schematic diagram of an exemplary implementation of an SMPS, according to an embodiment of the present invention.

As depicted, this implementation of a SMPS may include a power supply 100, a feedback circuit 200, a switching controller 300, and an output unit 400.

The power supply 100 may include a bridge diode (BD) 102 for rectifying an alternating current (AC) input 104, a capacitor Cin 106 for smoothing the rectified voltage, a primary coil L1 108 of a transformer coupled to an input power Vin, a switching transistor Qsw 110 coupled to the primary coil L1 108, and a sense resistor Rsense 112 coupled between a source of the transistor Qsw 110 and a ground. The sense resistor Rsense 112 may sense the current flowing through the transistor Qsw 110. In this instance, the switching transistor is implemented as a MOSFET, although other types of transistors can be used (e.g., BJTs, IGBTs, IGFETs, etc.).

The power supply 100 receives the input power Vin and supplies an output Vout to a secondary coil L2 402 of the transformer in the output unit 400. The SMPS may function to feed back the output voltage Vout, operate the transistor Qsw 110 by using the feedback voltage, and regulate the output voltage accordingly.

The output unit 400 may include a diode D1 404 having an anode coupled to the secondary coil L2 402 of the transformer, a capacitor C1 406 coupled between a cathode of the diode D1 404 and the ground, resistors R3 408 and R4 410 coupled in series between the cathode of the diode D1 404 and the ground, an error amplifier Amp1 412 having an inverting terminal (−) coupled to a node between the resistors R3 408 and R4 410 and a non-inverting terminal (+) coupled to a reference voltage Vref, and a photo diode PC1 414 coupled to an output terminal of the error amplifier Amp1 412.

The output unit 400 applies the output voltage Vout to a load and provides information on the output voltage Vout to the feedback circuit 200 so as to regulate the output voltage Vout. In this instance, an output voltage having a magnitude of R3/(R3+R4)*Vout divided by the resistors R3 and R4 and the reference voltage Vref are applied to the inverting terminal and the non-inverting terminal, respectively, of the error amplifier Amp1 412 to compare both voltages and determine the current flowing to the photo diode PC1 414. The photo diode PC1 414 and a photo transistor PC2 202 of the feedback circuit 200 form a photo coupler or optocoupler to provide information corresponding to the output voltage Vout to the feedback circuit 200.

The feedback circuit 200 may include the photo transistor PC2 202 and a capacitor Cfb 204 coupled in parallel to the photo transistor PC2 202. In this instance, the current corresponding to the output voltage Vout of the output unit 200 flows to the photo transistor PC2 202. Accordingly, a relatively large current flows to the photo transistor PC2 202 to reduce the feedback voltage Vfb stored in the capacitor Cfb 204 when the output voltage Vout is high, and a relatively small current flows to the photo transistor PC2 to increase the feedback voltage Vfb charged in the capacitor Cfb when the output voltage Vout is low. The feedback voltage Vfb is high if the output voltage Vout of the output unit 400 is low, such as during an initial startup of the SMPS or if a protection circuit is operated. Information corresponding to the output voltage Vout is sensed by the feedback circuit 200, applied to the switching controller 300, and used to control the duty cycle of the transistor Qsw 110.

The feedback circuit 200 may include the photo transistor PC2 202 and a capacitor Cfb 204 coupled in parallel to the photo transistor PC2 202. In this instance, the current corresponding to the output voltage Vout of the output unit 400 flows to the photo transistor PC2 202. Accordingly, a relatively large current flows to the photo transistor PC2 202 to reduce the feedback voltage Vfb stored in the capacitor Cfb 204 when the output voltage Vout is high, and a relatively small current flows to the photo transistor PC2 to increase the feedback voltage Vfb charged in the capacitor Cfb when the output voltage Vout is low. The feedback voltage Vfb is high if the output voltage Vout of the output unit 400 is low, such as during an initial startup of the SMPS or if a protection circuit is operated. Information corresponding to the output voltage Vout is sensed by the feedback circuit 200, applied to the switching controller 300, and used to control the duty cycle of the transistor Qsw 110.

The switching controller 300 controls switching of the transistor Qsw 110 so as to prevent overcurrent generated during an initial startup or when a protection circuit is operated. An implementation of the switching controller 300 will now be described in detail.

Figure 3:
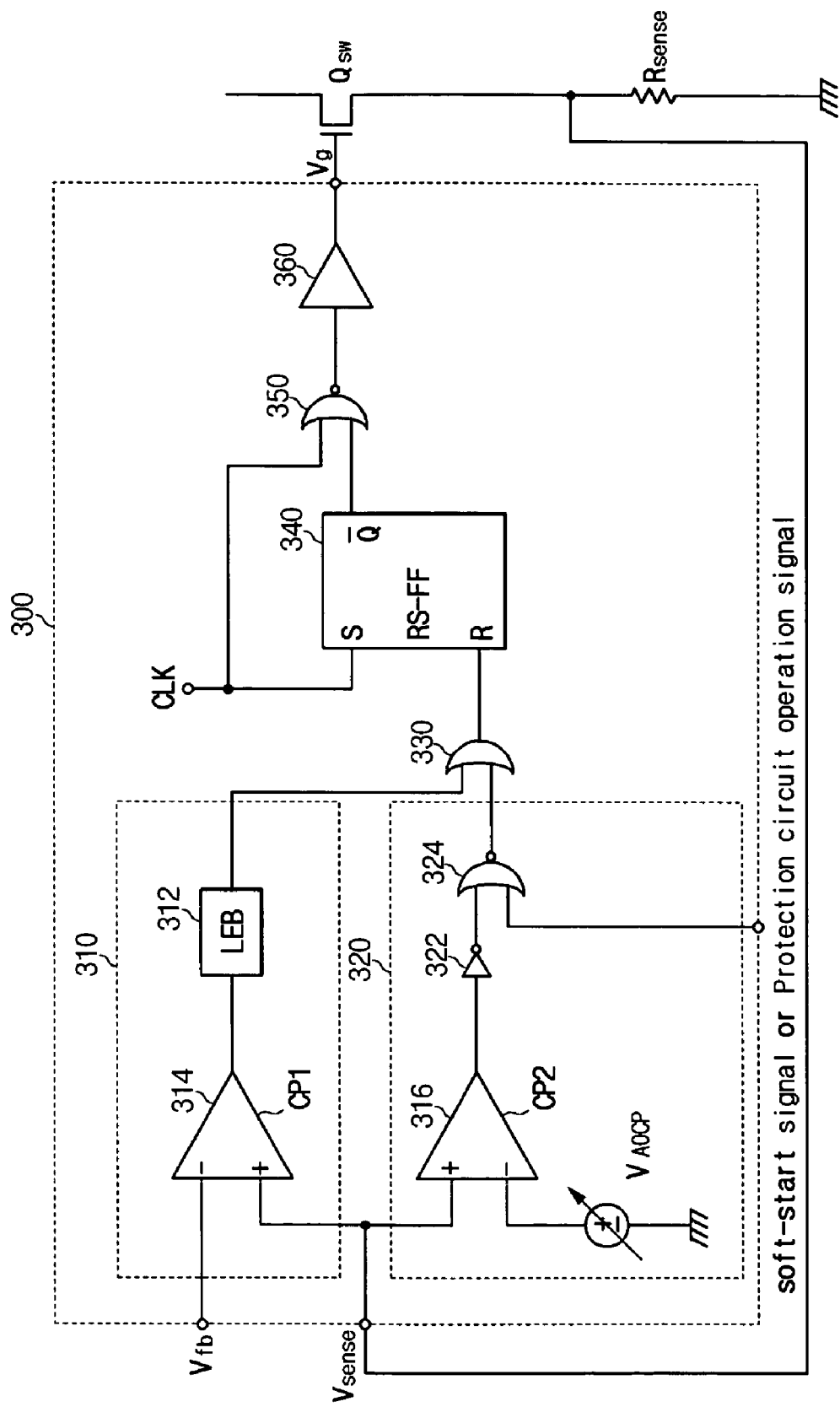
FIG. 3 is a schematic diagram of an exemplary implementation of a switching controller, according to an embodiment of the present invention.

FIG. 3 is a schematic diagram of one exemplary implementation for a switching controller 300, according to an embodiment of the present invention. As shown, switching controller 300 may include a normal operation circuit 310, an overcurrent operation circuit 320, an OR gate 330, an RS flipflop 340, a NOR gate 350, and a gate driver 360.

The normal operation circuit 310 may include a comparator CP1 314 having an inverting terminal for receiving the feedback voltage Vfb and a non-inverting terminal for receiving the sense voltage Vsense, and a leading edge blanking (LEB) 312 circuit coupled to the comparator CP1 314. The LEB circuit 312 may include an RC filter to eliminate the parasitic current caused by the inverse recovery current of the diode D1 404 of the output unit 400. The LEB circuit 312 applies an output to a first input terminal of the OR gate 330. In this instance, the normal operation circuit 310 uses the comparator CP1 314 to output a High signal when the sense voltage Vsense is higher than the feedback voltage Vfb. The High signal turns off the transistor Qsw 110 in periods other than an initial startup or when a protection circuit is operated.

The overcurrent operation circuit 320 may include a comparator CP2 316 having a non-inverting terminal and an inverting terminal for respectively receiving the sense voltage Vsense and a soft start voltage $V_{AOCP}$. An inverter 322 is coupled to an output terminal of the comparator CP2 316. A NOR gate 324 has a first input terminal for receiving an output signal from the inverter 322 and a second input terminal for receiving a soft start signal or a protection circuit operation signal. An output signal of the NOR gate 324 is applied to a second input terminal of the OR gate 330. In this instance, the soft start signal is Low when the soft start method is used or applied during an initial startup of the SMPS; the soft start signal is High in other cases. The protection circuit operation signal is Low when the protection circuit is operated, and is High in other cases. If the feedback voltage Vfb is increased when the load is shorted and a protection circuit is operated, the operational status of the protection circuit is detected by determining whether the feedback voltage Vfb is greater than a threshold value, and the application status of the soft start method is detected by determining whether the SMPS is turned on or off.

The OR gate 330 may output a High signal slower upon receiving a High signal from the normal operation circuit 310 through the first input terminal of the OR gate 330 than upon receiving a High signal from the overcurrent operation circuit 320 through the second input terminal thereof. The time it takes for the output signal of the comparator CP1 314 to reach the OR gate 330 may be longer since the normal operation circuit 310 includes the LEB circuit 312, and the time it takes for the output signal of the comparator CP2 312 to reach the OR gate 330 may be shorter since the overcurrent operation circuit 320 is comprises of a logic circuit.

The RS flipflop 340 has a set (S) terminal for receiving clock signal CLK and a reset (R) terminal for receiving output from the OR gate 330. The clock signal CLK is also provided to the first input terminal of the NOR gate 350, and an output terminal (/Q) of the RS flipflop 340 is coupled to the second terminal of the NOR gate 350. The output terminal of the NOR gate 350 is coupled to the gate driver 360 such that the gate driver 360 turns on/off the transistor Qsw 110 according to output signals of the NOR gate 350. In this instance, a High signal is applied to the gate driver 360 to turn on the transistor Qsw 110 when the clock signal CLK is Low, and a Low signal is applied to the gate driver 360 to turn off the transistor 110 when the output terminal (/Q) of the RS flipflop 340 outputs a High signal. The output terminal (/Q) outputs a High signal when a High signal is applied to the R terminal of the RS flip-flop 340. The application of a High signal to the R terminal is determined by the faster of the High signals output from the normal operation circuit 310 and the overcurrent operation circuit 320.

A method for preventing an overcurrent by the exemplary switching controller 300 will be described with reference to FIGS. 4 and 5.

Figure 4:
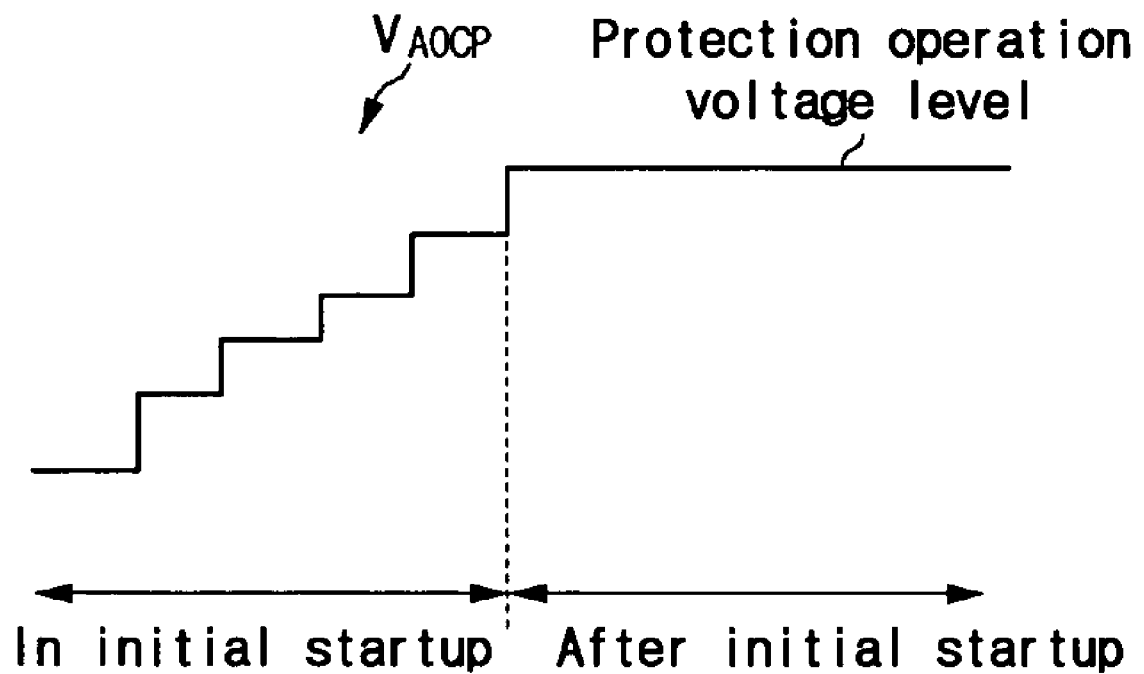
FIG. 4 is a diagram representing a voltage applied to an inverting terminal of a comparator of the switching controller, according to an embodiment of the present invention.

FIG. 4 is a diagram representing a voltage $V_{AOCP}$ applied to the inverting terminal of the comparator CP2 316 of the switching controller 300, according to an embodiment of the present invention. FIG. 5 is a diagram representing a drain-source current $I_{LIM}$ flowing through a switching transistor Qsw 110 in the SMPS and a drain-source voltage $V_{DS}$ at the switching transistor Qsw 110 according to an embodiment of the present invention.

As shown in FIG. 4, the voltage $V_{AOCP}$ rises in stepwise fashion during an initial startup, and is maintained at a predetermined voltage level ("protection operation voltage level") after the initial startup so as to control the power supplied to the output unit 400. In this instance, the voltage level is set to control the power supplied to the output unit 400 when a protection circuit is operated. In an alternative embodiment to the stepwise fashion, the voltage $V_{AOCP}$ may rise gradually in a manner like a ramp waveform.

An operation of the switching controller 300 during an initial startup will now be described.

During an initial startup, the voltage $V_{AOCP}$ may rise in stepwise fashion from a low voltage level to progressively higher voltage levels. Since the output unit 400 may require a significant amount of power during an initial startup, the feedback voltage Vfb may be a high voltage, and the voltage at the inverting terminal of the comparator CP2 316 may be a voltage lower than the feedback voltage Vfb because of the voltage $V_{AOCP}$. In this instance, when the transistor Qsw 110 is turned on and the sense voltage Vsense is increased, the comparator CP2 316 outputs a High signal prior to the comparator CP1 314. This causes the soft start signal input to the second input terminal of the NOR gate 324 to become Low, and the overcurrent operation circuit 320 outputs a High signal to the second input terminal of the OR gate 330. The comparator CP1 314 outputs a High signal after the comparator CP2 316 does because a circuit time delay of the normal operation circuit 310 is longer than that of the overcurrent operation circuit 320. The normal operation circuit 310 accordingly outputs the High signal later than the overcurrent operation circuit 320. Hence, the transistor Qsw 110 is turned off by the High signal output by the overcurrent operation circuit 320.

Since the overcurrent operation circuit 320 does not have an LEB circuit 312, the overcurrent operation circuit 320 may have a very short circuit delay and the High signal output by the comparator CP2 316 quickly turns off the transistor Qsw 110. Accordingly, the current $I_{LIM}$ does not exceed the maximum level ($I_{LIM}$ max level) as shown in FIG. 5 at (a), and the drain-source voltage $V_{DS}$ of the transistor Qsw 110 does not exceed the maximum level (BV max level) as shown in FIG. 5 at (b). The "AOCP $I_{LIM}$ control level" is the current $I_{LIM}$ flowing through the main switch and a reference current for turning off the main switch during an initial startup. It is increased together with the level $V_{AOCP}$ shown in FIG. 4.

Figure 5:
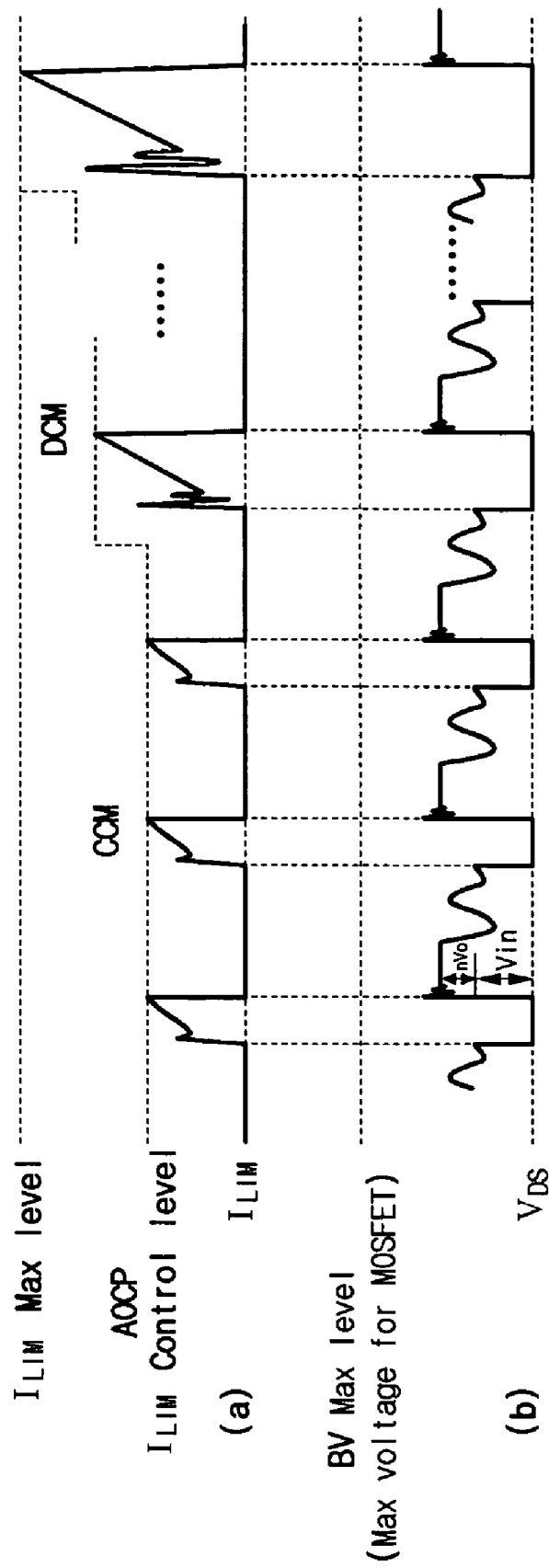
FIG. 5 is a diagram representing a drain-source current flowing through a switching MOS transistor in the SMPS and a drain-source voltage at the switching MOS transistor, according to an embodiment of the present invention.

Referring to FIG. 5 at (b), when the transistor Qsw 110 is turned off, the drain-source voltage $V_{DS}$ may be a sum (i.e., Vin+n*Vout) of winding ratios of the input voltage Vin and the output voltage Vout (where the winding ratio of the primary coil 108 vs. the secondary coil 402 of the transformer is given as n:1), and the voltage $V_{DS}$ does not exceed the maximum voltage level of the transistor 110. The voltage $V_{DS}$ of FIG. 5 at (b) is resonated after the transistor 110 is turned off where the SMPS is operated in, for example, a fly back mode.

As described, the transistor 110 may be turned off by the High signal output by the overcurrent operation circuit 320 during an initial startup, and the overcurrent operation circuit 320 may have a very short circuit delay to prevent the abnormal overcurrent generated by the current Ipeak flowing through the transistor Qsw 110.

A normal operation of the switching controller 300 after an initial startup will now be described.

In a normal operation state, a High signal is applied to the second input terminal of the NOR gate 324. The NOR gate 324 outputs a Low signal, which causes the overcurrent operation circuit 320 to output a Low signal. The transistor 110 is operated by the signal output by the normal operation circuit 310. That is, the comparator CP1 314 outputs the High signal when the sense voltage Vsense becomes greater than the feedback voltage Vfb, and the transistor Qsw 110 is turned off because of the High signal. The overcurrent state occurs only rarely in the normal operation state. The overcurrent state occurs rarely when the circuit delay is transmitted through the long LEB circuit 312.

An operation of the switching controller 300 when a protection circuit is operated will now be described.

The current $I_{LIM}$ may become an overcurrent when the feedback voltage Vfb is steeply increased and the circuit delay is long while a protection circuit is operated. Hence, a Low signal is applied to the second input terminal of the NOR gate 324 when a protection circuit is operated to prevent the overcurrent state. When the Low signal is applied to the second input terminal of the NOR gate 324, the transistor Qsw 110 is turned off by the High signal output of the overcurrent operation circuit 320. When a protection circuit is operated, the voltage $V_{AOCP}$ input to the inverting terminal of the comparator CP2 316 may be fixed at a protection operation voltage level (which is predefined such that the current $I_{LM}$ may not become an overcurrent when the protection circuit is operated).

That is, the transistor Qsw 110 is not operated by the normal operation circuit 310, but instead the transistor Qsw 110 is operated by the overcurrent operation circuit 320 when a protection circuit is operated. Therefore, when a protection circuit is operated or the sense voltage Vsense is increased to a protection operation voltage level, a High signal is output by the comparator CP2 316, a Low signal is applied to the second input terminal of the NOR gate 324, and a High signal is applied to the R terminal of the RS flipflop 340. This causes the transistor Qsw 110 to turn off. That is, the current $I_{LIM}$ may be reduced by turning off the transistor 110 when the sense voltage Vsense becomes a predetermined protection operation voltage level. Also, the overcurrent (i.e., the overcurrent of $I_{LIM}$) phenomenon generated by a long circuit delay may be prevented since the signal is transmitted through the overcurrent operation circuit 320 with a short circuit delay while the protection circuit is operated.

Therefore, the abnormal overcurrent may be prevented by transmitting a signal for turning off the switching transistor 110 through a circuit with a short circuit delay during an initial startup or when a protection circuit is operated. The rise of the drain-source voltage at the switching transistor 110, which may occur because of the overcurrent, is reduced when the switching transistor 110 is turned off. This reduces costs by allowing the use of a switching transistor 110 with a lower threshold voltage.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A switching mode power supply (SMPS) comprising:
a power supply having a main switch coupled to a primary coil of a transformer, and supplying power to a secondary coil of the transformer according to an operation of the main switch;
a feedback circuit for generating a feedback voltage corresponding to an output voltage at the secondary coil; and
a switching controller comprising:
a normal operation circuit for comparing the feedback voltage to a first voltage corresponding to a current flowing through the main switch, and generating a first control signal for controlling the duty of the main switch; and
an overcurrent operation circuit for comparing a predetermined voltage with the first voltage and generating a second control signal for controlling the duty of the main switch, wherein the overcurrent operation circuit has a circuit delay which is shorter than that of the normal operation circuits,
wherein a source of the predetermined voltage is configured to generate the predetermined voltage during an initial startup to start from a second voltage, gradually rise at a rate not determined by a rise of a supply voltage, and level off at a third voltage.

2. The SMPS of claim 1, wherein the main switch is turned off by the second control signal in an initial startup of the SMPS.

3. The SMPS of claim 2, wherein the main switch is turned off by the second control signal when a protection circuit of the SMPS is operated.

4. The SMPS of claim 1, wherein the main switch is turned off by the first control signal in periods other than an initial startup of the SMPS and when a protection circuit of the SMPS is operated.

5. The SMPS of claim 1, wherein the overcurrent operation circuit comprises:
a first comparator for comparing the predetermined voltage to the first voltage;
an inverter for inverting an output of the first comparator; and
a NOR gate having a first input terminal for receiving an output from the inverter, and a second input terminal for receiving a low signal in an initial startup of the SMPS or when a protection circuit of the SMPS is operated.

6. The SMPS of claim 5, wherein the normal operation circuit comprises:
a second comparator for comparing the feedback voltage to the first voltage; and
a leading edge blanking circuit coupled to an output terminal of the second comparator.

7. The SMPS of claim 6, wherein the switching controller further comprises an OR gate having a first input terminal for receiving the first control signal from the normal operation circuit and a second input terminal for receiving the second control signal from the overcurrent operation circuit, and turns off the main switch in response to a control signal input.

8. The SMPS of claim 1, wherein the first and second control signals are used to control the main switch to turn off.

9. A switching controller for controlling a duty of a main switch of a switching mode power supply (SMPS), the SMPS including the main switch coupled to a primary coil of a transformer and a feedback circuit for generating a feedback voltage corresponding to an output voltage at a secondary coil of the transformer, the controller comprising:

a first comparator for comparing the feedback voltage to a first voltage corresponding to a current flowing through the main switch;

a leading edge blanking circuit, having an input terminal coupled to an output terminal of the first comparator;

a second comparator for comparing a predetermined voltage to the first voltage;

an inverter for inverting an output of the second comparator;

a NOR gate having a first input terminal for receiving an output from the inverter, and a second input terminal for receiving a low signal in an initial startup of the SMPS or when a protection circuit of the SMPS is operated; and an OR gate having a first input terminal for receiving an output from the leading edge blanking circuit, and a second input terminal for receiving an output from the NOR gate, wherein a duty of the main switch is controlled by the earlier of the signals applied to the first and second input terminals of the OR gate, wherein a source of the predetermined voltage is configured to generate the predetermined voltage during an initial startup to start from a second voltage, gradually rise at a rate not determined by a rise of a supply voltage, and level off at a third voltage.

10. The switching controller of claim 9, wherein the predetermined voltage starts from a second voltage in an initial startup, gradually rises, and is maintained at a third voltage.

11. The switching controller of claim 9, wherein a duty of the main switch is controlled by a signal applied to the second input terminal of the OR gate in an initial startup of the SMPS or when a protection circuit of the SMPS is operated.

12. The switching controller of claim 9, wherein a duty of the main switch is controlled by a signal applied to the first input terminal of the OR gate in periods other than an initial startup of the SMPS or when a protection circuit of the SMPS is operated.

* * * * *